(12) United States Patent
Dhore

(10) Patent No.: US 8,492,652 B2
(45) Date of Patent: Jul. 23, 2013

(54) APPARATUS AND METHOD TO ATTACH PROBE TO JUNCTION BOX

(75) Inventor: Anup P. Dhore, Bangalore (IN)

(73) Assignee: General Electric Company, Schenectady, NY (US)

( * ) Notice: Subject to any disclaimer, the term of this patent is extended or adjusted under 35 U.S.C. 154(b) by 158 days.

(21) Appl. No.: 13/106,416

(22) Filed: May 12, 2011

(65) Prior Publication Data

US 2012/0285739 A1   Nov. 15, 2012

(51) Int. Cl.
*H05K 7/14* (2006.01)

(52) U.S. Cl.
USPC .............. 174/53; 174/59; 73/431; 361/826; 362/253

(58) Field of Classification Search
USPC ......... 174/53, 59; 361/730, 724, 826; 73/431; 362/253
See application file for complete search history.

(56) References Cited

U.S. PATENT DOCUMENTS

| | | | | |
|---|---|---|---|---|
| 5,704,813 | A * | 1/1998 | Weeks et al. | 439/694 |
| 6,555,748 | B1 * | 4/2003 | Gul | 174/59 |
| 6,788,054 | B2 * | 9/2004 | Collins et al. | 324/262 |
| 6,821,250 | B2 | 11/2004 | Mesaros et al. | |
| 6,975,508 | B2 | 12/2005 | Hoegener et al. | |
| 7,074,063 | B1 | 7/2006 | Bailey et al. | |
| 8,210,037 | B2 * | 7/2012 | Christoph et al. | 73/431 |
| 8,245,574 | B2 * | 8/2012 | Dossenbach et al. | 73/431 |
| 2005/0085733 | A1 | 4/2005 | Wong | |
| 2009/0073694 | A1 | 3/2009 | Scannell, Jr. | |

FOREIGN PATENT DOCUMENTS

GB   1414957   11/1975

\* cited by examiner

*Primary Examiner* — Dhirubhai R Patel
(74) *Attorney, Agent, or Firm* — Hiscock & Barclay LLP

(57) ABSTRACT

A junction box for a probe is disclosed for connecting to a sensor assembly of the probe, wherein the sensor assembly has a housing and a plate. The junction box comprises stopper walls, retaining flanges, and a retainer spring to secure the plate junction box. The probe can be assembled by inserting the sensor assembly through the opening, pressing the plate onto the at least one retainer spring and elastically deforming the at least one retainer spring, and rotating the sensor assembly into an assembled position.

20 Claims, 3 Drawing Sheets

APPARATUS AND METHOD TO ATTACH PROBE TO JUNCTION BOX

BACKGROUND OF THE INVENTION

The subject matter disclosed herein relates to probes with junction boxes, and more particularly, to the attachment of a probe to a junction box.

Some probes, such as but not limited to $CO_2$ duct probe transmitters, can have a sensor assembly attached to a junction box. The sensor assembly can have a sensor housing enclosing or partially enclosing one or more sensors, and a sensor plate attached to one end of the sensor housing. The junction box can have an opening on one side to fit the sensor housing. The sensor housing can be inserted through the opening so that the sensor plate attached to one end of the sensor housing can mate against the inside surface of the side of the junction box with the opening, and the cylindrical sensor housing can protrude from the junction box. The inside surface of the junction box can have a mating area defined by walls that enclose an area to fit the shape of the sensor plate.

In some installations, a snap clip is aligned on each edge of the mating area on the inside surface of the junction box. Each snap clip has a base extending a short length along the end of the mating area and extending perpendicularly from the mating area of the junction box to a ramped portion overhanging the mating area and tapering toward the tip that is extended farthest from the mating area. In assembling the sensor assembly with the junction box, the sensor housing can be inserted through the opening through the mating area until the sensor plate contacts the ramped portion of the snap clips. The snap clips interfere with the further progression of the sensor plate, so an additional force is applied to press the sensor plate past the ramped portion until the sensor plate mates against the inside mating area of the junction box. The snap clips are intended to elastically deform or flex outward and then snap back to a non-flexed or non-deformed position after the sensor plate is pushed past the ramped, overhanging portion. When the ramped overhanging portion snaps back into the non-flexed or non-deformed position, the ramped overhanging portion is intended to retain the sensor plate against the mating area of the junction box. Each wall or snap clip base is intended to retain the sensor plate from sliding against the inside surface of the junction box in one direction.

The snap clip design can be prone to several deficiencies. During the first use, rather than elastically deforming when the sensor plate is pressed into place, the snap clip can be permanently deformed, compromising the strength, tightness, and proper fit with which the sensor plate is held to the junction box. The snap clip can also break. For example, the base wall can break or the tapered portion can sheer off or snap off. Permanent deformation and/or breaking become increasingly likely to occur with each repeated assembly or disassembly, which makes disassembly and reassembly after the initial assembly problematic. Disassembly is more complicated than assembly as the sensor plate cannot simply be pulled apart from the junction box. Snap clips must be pried back to allow the sensor plate to be pulled away freely, which increases the likelihood of breaking a snap clip either by improperly pulling away the sensor plate with one or more snap clips still obstructing, or by putting too much force on the snap clips when prying the snap clips back. When a snap clip breaks, the junction box must be replaced at additional cost.

Therefore, there is a need for a more durable and easier method and/or apparatus to assemble and disassemble a sensor assembly with a junction box.

The discussion above is merely provided for general background information and is not intended to be used as an aid in determining the scope of the claimed subject matter.

BRIEF DESCRIPTION OF THE INVENTION

A junction box for a probe is disclosed for connecting to a sensor assembly of the probe, wherein the sensor assembly has a housing and a plate. The junction box comprises stopper walls, retaining flanges, and a retainer spring to secure the plate junction box. An advantage that may be realized in the practice of some disclosed embodiments of the junction box is easier and more durable assembly and/or disassembly.

In one exemplary embodiment, a junction box for a probe is disclosed for connecting to a sensor assembly of a probe, wherein the sensor assembly has a housing and a plate. The junction box can comprise a wall comprising an opening configured to accept insertion of the housing, a mating area on the interior surface of the wall, wherein the mating area comprises a perimeter encompassing the opening and is sized and shaped to be congruent with the plate, at least two stopper walls aligned proximate the perimeter of the mating area projected outward from the interior surface of the wall to obstruct the plate from rotating in a first rotational direction out of an assembled position, at least two retaining flanges, wherein each of the at least two retaining flanges projects from one of the stopper walls and extends over the mating area at a distance offset from the interior surface of the wall to obstruct the plate from moving out of the assembled position in a direction perpendicular to the interior surface of the wall, and at least one retainer spring comprising an interior edge aligned in a plane proximate the perimeter of the mating area and projecting outward from the interior surface of the wall, wherein the at least one retainer spring is elastically deformable and configured to be pressed toward the interior surface of the wall during assembly without permanently deforming and to return to a non-flexed position when the plate reaches the assembled position to obstruct rotation of the plate in a second rotational direction opposite the first rotational direction out of the assembled position.

In another exemplary embodiment, a junction box for connecting to a sensor assembly of a probe is provided. The sensor assembly can have a housing and a plate, and the junction box can comprise a wall, a mating area on the interior surface of the wall, at least two stopper walls, at least two retaining flanges, and at least one retainer spring. The wall can comprise an opening configured to accept insertion of the housing. The mating area can comprise a perimeter encompassing the opening and can be sized and shaped to be congruent with the plate. The at least two stopper walls can be aligned proximate the perimeter of the mating area and can project outward from the interior surface of the wall to obstruct the plate from rotating in a first rotational direction out of an assembled position. The at least two retaining flanges can project from one of the stopper walls and can extend over the mating area at a distance offset from the interior surface of the wall to obstruct the plate from moving out of the assembled position in a direction perpendicular to the interior surface of the wall. The at least one retainer spring can comprise an interior edge, a base portion, a stepped portion, and a pressing portion, wherein the interior edge is aligned in a plane proximate the perimeter of the mating area and projecting outward from the interior surface of the wall. The base portion can extend from the interior surface of the wall. The stepped portion can extend from the base portion and can project outward from the interior surface of the wall. The pressing portion can extend from the stepped portion substantially parallel to the interior surface of the wall. The at least one retainer spring can be elastically deformable and can be configured to be pressed toward the interior surface of the wall during assembly without permanently deforming and can be configured to return to a non-flexed position when the plate reaches the assembled position to obstruct rotation of the plate in a second rotational direction opposite the first rotational direction out of the assembled position.

In another exemplary embodiment, a method of assembling a junction box and a sensor assembly of a probe is disclosed. The sensor assembly can comprise a housing and a plate. The junction box can comprise a wall, a mating area with a perimeter on the interior of the wall, at least two stopper walls aligned proximate the perimeter of the mating area, at least two retaining flanges, and at least one retainer spring, wherein the wall comprises an opening, the perimeter of the mating area encompasses the opening, the at least two stopper walls project outward from the interior surface of the wall, each of the at least two retaining flanges project from one of the stopper walls and extends over the mating area at a distance offset from the interior surface of the wall, and at least one retainer spring comprises an interior edge aligned in a plane proximate the perimeter of the mating area and projects outward from the interior of the surface of the wall. The method can comprise the steps of providing the sensor assembly and the junction box, inserting the sensor assembly through an opening of the junction box, pressing the plate onto the at least one retainer spring and elastically deforming the at least one retainer spring, and rotating the sensor assembly into an assembled position.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
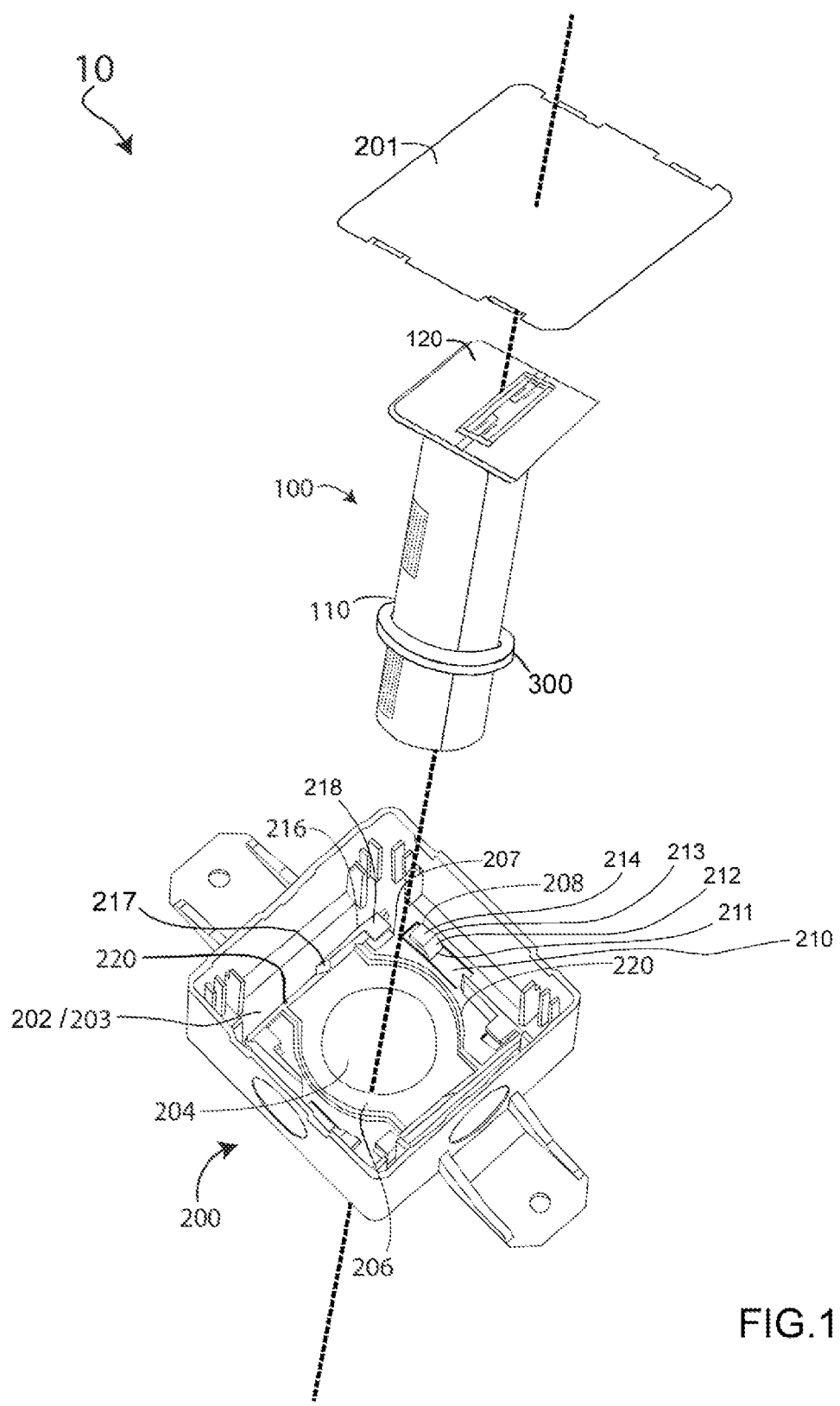
FIG. 1 is a perspective view of an unassembled probe, with a sensor assembly and an open junction box, in an exemplary embodiment of the invention.

FIG. 1 is a perspective view of an unassembled probe 10, with a sensor assembly 100 and open junction box 200, in an exemplary embodiment of the invention. The sensor assembly 100 can comprise a sensor housing 110 and a sensor plate 120. As shown in FIG. 1, the sensor housing 110 can be cylindrical, and the sensor plate 120 can be on one end of the sensor housing 110. The sensor plate 120 can be rectangular, and the sensor plate 120 can be perpendicular to the sensor housing 110. It will be understood that the sensor housing 110 and the sensor plate 120 can each be shaped otherwise, as would be known by one skilled in the art.

The junction box 200 is shown open with a lid 201 removed from the open side. The junction box 200 can comprise a wall 202 opposite the open side with an interior surface 203 defining an opening 204 through the wall 202. The opening 204 can correspond to the shape and size of the sensor housing 110. In the illustrated embodiment, because the sensor housing 110 is substantially cylindrical, the opening 204 is circular, and sized with a diameter large enough to pass through the substantially cylindrical sensor housing 110.

The interior surface 203 of the junction box 200 that defines the opening 204 can comprise a mating area 206. The mating area 206 can have a perimeter 207, can encompass the opening 204, can correspond to the shape and size of the sensor plate 120, and can comprise rests 220. In the illustrated embodiment, because the sensor plate 120 is substantially rectangular, the mating area 206 is substantially rectangular. The mating area 206 and the sensor plate 120 can have one or more congruently shaped asymmetrical features to promote proper orientation of the sensor plate 120 with respect to the junction box 200 during assembly. For example, one corner can be chamfered on the mating area 206 and the sensor plate 120, to indicate the proper orientation of the sensor plate 120 with respect to the mating area 206. In another example, the opening 204 can be offset from the center of the mating area 206, and the sensor housing 110 can similarly be offset from the center of the sensor plate 120, to promote proper orientation. In another example, the mating area 206 and the sensor plate 120 can be similarly long or short in one dimension, so that the sensor plate 120 only fits to the mating area 206 in the desired orientation.

Adjacent to the mating area 206, the junction box 200 can comprise at least one retainer spring 208. Each retainer spring 208 can have an interior edge in a plane proximate or aligned along the perimeter 207 of the mating area 206. Each retainer spring 208 can project outward from the interior surface 203. Each retainer spring 208 can have a base portion 210, a stepped portion 212, and a pressing portion 214. The base portion 210 can extend substantially parallel to the interior surface 203 of the junction box 200 either aligned substantially with the plane of the interior surface 203 of the junction box 200 or offset in either direction from the plane of the interior surface 203 of the junction box 200. Alternatively, the base portion 210 can be angled outward from the interior surface 203.

The stepped portion 212 can extend from the base portion 210 and project outward from the interior surface 203 of the junction box 200. The projection can range between perpendicular to the interior surface 203 of the junction box 200 and parallel to the interior surface 203 of the junction box 200. A first bend 211 can delineate between the base portion 210 and the stepped portion 212. A second bend 213 can delineate between the stepped portion 212 and the pressing portion 214. Each bend 211, 213 can be abrupt (e.g., having a relatively small radius) or gradual (e.g., having a relatively large radius). The pressing portion 214 can extend from the stepped portion 212 substantially parallel to the interior surface 203 of the junction box 200, as illustrated in FIG. 1, or can also be angled at an offset from parallel.

In the embodiment illustrated by FIG. 1, there are two retainer springs 208 on opposing sides of the mating area 206 180 degrees from each other. Other configurations and numbers of retainer springs 208 are conceived. For instance, there can be more or less retainer springs 208 (e.g., one, three, or four), or the retainer springs 208 can be positioned in different locations along the respective edge of the mating area 206. More retainer springs 208 could more securely lock the sensor plate 120 to the mating area 206. Less retainer springs 208 could decrease manufacturing costs and make it easier to disassemble the sensor assembly 100 from the junction box 200. Having two retainer springs 208 on opposing sides of the mating area 206 can provide a balanced force to retain the sensor plate 120 when the sensor assembly 100 is assembled with the junction box 200.

Also adjacent to the mating area 206, the junction box 200 can comprise at least two stopper walls 216. Each stopper wall 216 can comprise an edge aligned on or proximate the perimeter 207 of the mating area 206. Each stopper wall 216 can be attached to the interior surface 203 of the junction box 200 and can project outward (e.g., substantially perpendicularly) from the interior surface 203. Each stopper wall 216 can extend a relatively short length along the respective edge of the mating area 206 with respect to the full length of the respective edge. Each stopper wall 216 can have a chamfered or tapered end 217.

Two or more stopper walls 216 can further comprise a retaining flange 218 that projects from the stopper walls 216 at a distance offset from the interior surface 203, and that extends over the mating area 206 substantially parallel to the interior surface 203. The offset distance can be large enough at least to fit the thickness of the sensor plate 120 between the retaining flange 218 and the mating area 206, including any rests 220 that are part of the mating area 206 and that project outward from the interior surface 203. Each retaining flange 218 can be positioned on an end of the length of one of the stopper walls 216 nearest a corner between two edges of the mating area 206.

Figure 2:
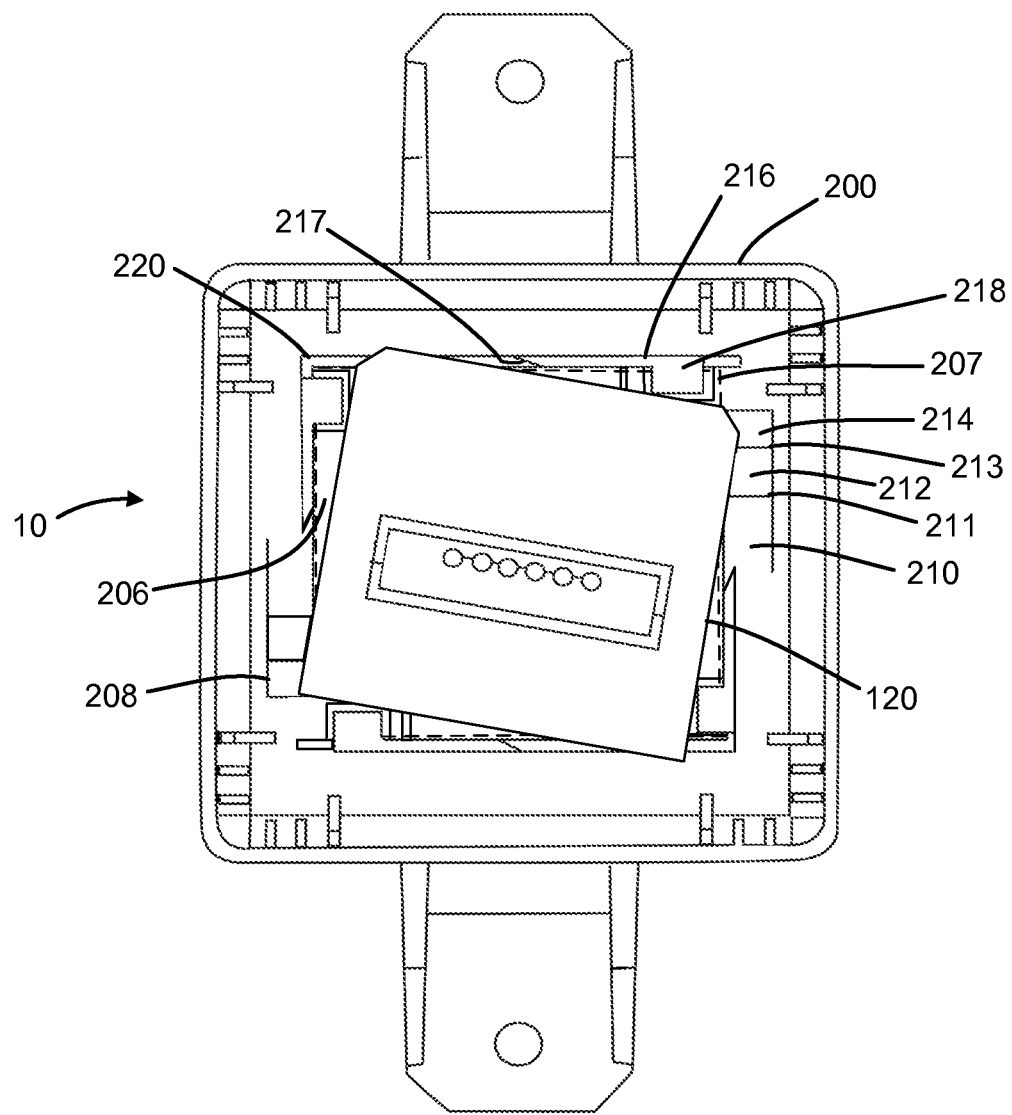
FIG. 2 is a top view of the probe of FIG. 1, illustrating the sensor assembly being assembled with the junction box, in one embodiment of the invention.

As illustrated in FIG. 2, to assemble the sensor assembly 100 with the junction box 200, the sensor assembly 100 can be inserted through the opening 204 until the sensor plate 120 contacts the retainer springs 208. When the sensor plate 120 contacts the retainer springs 208, the sensor assembly 100 can continue to be inserted so that the sensor plate 120 depresses the elastically deformable retainer springs 208 until the sensor plate 120 presses against the mating area 206, including any rests 220. The mating area 206 can be a smooth and/or flat surface upon which the sensor plate 120 presses flush. Alternatively, the mating area 206 can be comprised of the rests 220 that can protrude from the smooth and/or flat surface of the mating area 206, and the sensor plate 120 can seat against the rests 220. The rests 220 can be located around the perimeter 207 of the mating area 206 or be positioned elsewhere within the mating area 206. Some of the rests 220 can be positioned to enclose an elastically deformable seal or gasket 300 that can seal the joint between the sensor plate 120 and the mating area 206 around the opening 204, when the sensor assembly 100 is assembled with the junction box 200.

In one embodiment, the gasket 300 can be positioned between the sensor plate 120 and the mating area 206, and when the sensor assembly 100 is inserted through the opening 204 until the sensor plate 120 contacts and depresses the retainer springs 208, the sensor plate 120 also contacts and compresses the gasket 300 between the mating area 206 and the sensor plate 120. The gasket 300 can provide a force pushing the sensor plate 120 outward from the mating area 206 and the interior surface 203 of the wall 202.

In order to insert the sensor housing 110 fully through the opening 204 to contact the sensor plate 120 against the retainer springs 208, the sensor plate 120 can be oriented rotationally to a position in which the sensor plate 120 will avoid contacting the stopper walls 216 and/or the retaining flange 218 during insertion. This position of the sensor plate 120 during insertion can be at a rotational orientation offset from the mating area 206 so that the shape of the sensor plate 120 does not align with the shape of the mating area 206. The closer the stopper walls 216 and/or the retaining flanges 218 are positioned to the corners of the perimeter 207, the more space there can be for the sensor plate 120 to be inserted to contact the retainer springs 208 without being obstructed by the retaining flanges 218 or the stopper walls 216.

Figure 3:
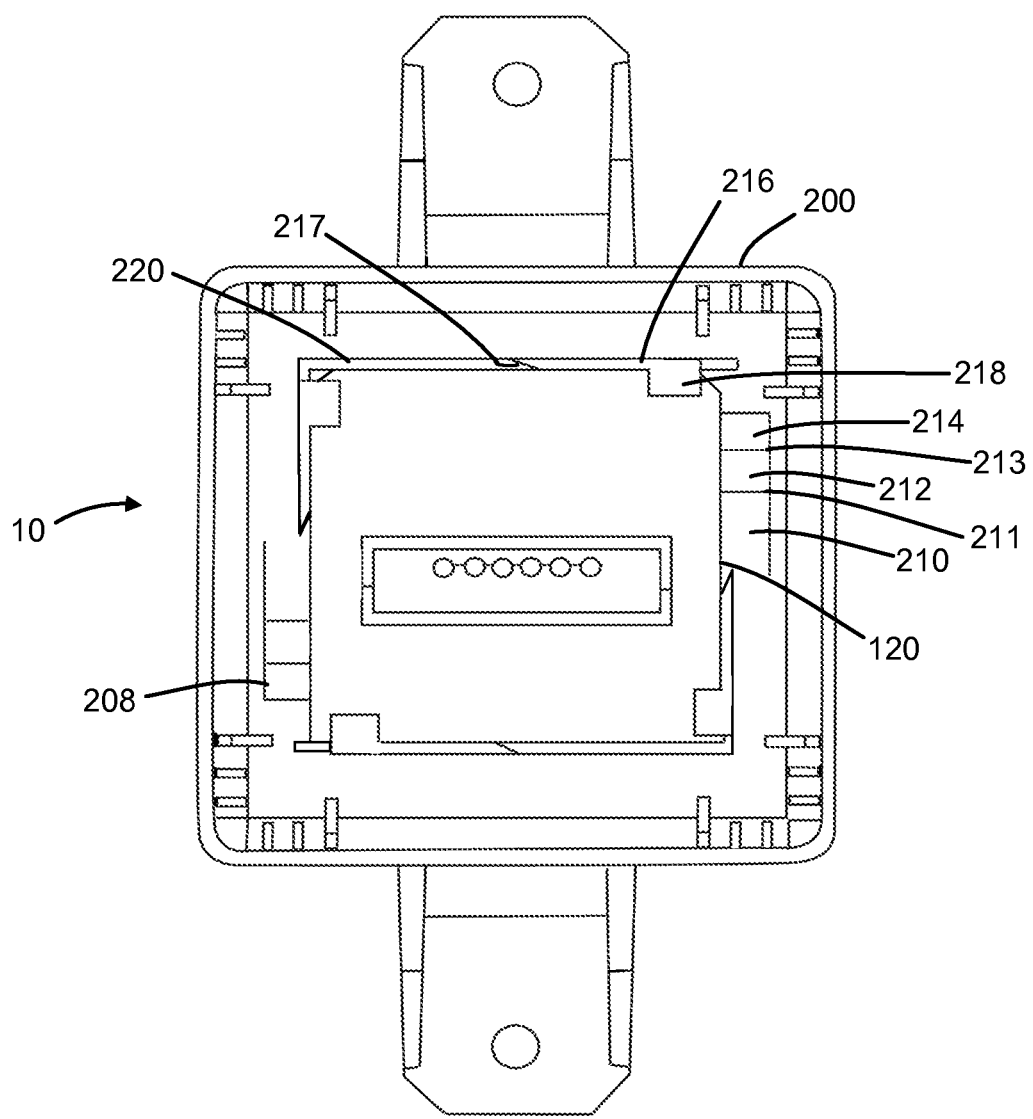
FIG. 3 is a top view of the probe of FIG. 1 illustrating the probe with the sensor assembly and the open junction box assembled, in one embodiment of the invention.

FIG. 3 is a top view of the probe 10 of FIG. 1 illustrating the probe 10 with the sensor assembly 100 and the open junction box 200 assembled, in one embodiment of the invention. As illustrated in FIG. 3, once the sensor assembly 110 is fully inserted through the opening 204 so the sensor plate 120 depresses the elastically deformable retainer springs 208 and the sensor plate 120 presses against the gasket 300 and/or the mating area 206, including any rests 220, the sensor assembly 100 can be rotated into an assembled, position locked under the retaining flanges 218 by rotating the sensor plate 120 in one direction until the sensor plate 120 corresponds and fits with the mating area 206. In the assembled, locked position, the sensor plate 120 is obstructed from rotating in one direction out of the assembled position by the stopper walls 216.

As shown in FIG. 3, the sensor plate 120 can be rotated counter-clockwise to move the sensor plate 120 into the locked position. If rotated clockwise, the sensor plate 120 will be obstructed by the chamfered or tapered end 217 of the stopper walls 216. The taper or chamfer can be angled to provide a flat surface to stop the sensor plate 120 from rotating in the incorrect direction, so that a sharp corner does not scratch or otherwise damage the sensor plate 120. In other configurations, the sensor plate 120 can be rotated clockwise to move the sensor plate 120 into the locked position, rather than counter-clockwise.

When the sensor plate 120 is rotated into the assembled position, the sensor plate 120 slides between the mating area 206 and the retaining flanges 218, and abuts the stopper walls 216. The retaining flanges 218 can obstruct or retain the sensor plate 120 from moving out of the assembled position in a direction perpendicular to the interior surface 203 of the junction box 200. There can be an interference fit between the sensor plate 120 and the retaining flanges 218. A relatively large amount of interference can produce a relatively tight lock, while requiring a relatively large force to rotate the sensor plate 120 into or out of the assembled position. A relatively small amount of interference can produce a relatively loose lock, while requiring a relatively small force to rotate the sensor plate 120 into or out of the assembled position. If a tighter fit is necessary, then using a retaining flange 218 that has some degree of elasticity or flexibility can help reduce the amount of force necessary to rotate the sensor plate 120 into or out of the assembled position, and can also help reduce the possibility the retaining flange 218 might break under the force from the sensor plate 120. Alternatively, the fit can be tight without any interference, so that the sensor plate 120 fits securely within a specified and desirable tolerance. In one embodiment using the gasket 300 between the sensor plate 120 and the mating area 206 around the opening 204, the gasket 300 can be thick enough to add pressure to force the sensor plate 120 against the retaining flanges 218. The gasket 300 can facilitate a tight fit and alleviate any clearance or looseness. The stopper walls 216 can prevent the sensor plate 120 from rotating out of the assembled position in one direction of rotation, or from over-rotating when positioning the sensor assembly 100 into the assembled position.

During rotation of the sensor plate 120 into the assembled position, pressure can be maintained on the retainer springs 208 to push the sensor plate 120 far enough toward the mating area 206 to have clearance (or a low enough friction if there is an interference fit with the retaining flanges 218) to rotate the sensor plate 120 under the retaining flanges 218. When the sensor plate 120 is rotated into the assembled position, the sensor plate 120 moves off the retainer springs 208, leaving the retainer springs 208 free and unobstructed to snap back to a non-flexed position. In the non-flexed position, the retainer springs 208 project away from the interior surface 203 of the junction box 200 so that the retainer springs 208 further lock the sensor plate 120 into place, preventing rotation of the sensor plate 120 in the opposite direction that the stopper walls 216 prevent rotation of the sensor plate 120.

In the illustrated embodiment, there are four stopper walls 216, four retaining flanges 218, and two retainer springs 208. Each stopper wall 216 stops one edge of the sensor plate 120, near a corner of the sensor plate 120 and/or a corner of the mating area 206, while allowing enough room for the sensor plate 120 to fit against the mating area 206 to be rotated into the assembled position. Having a relatively large number of stopper walls 216 and retaining flanges 218 provides relatively greater durability and strength, as the overall force applied to the stopper walls 216 and the retaining flanges 218 is distributed over more stopper walls 216 and retaining flanges 218. The illustrated embodiment shows two retainer springs 208, each on an opposing side of the mating area 206. A relatively larger number of retainer springs 208 will distribute the locking force over more retainer springs 208 and reduce the force on each individual retainer spring 208. Other configurations are conceived with varying shapes for the mating area 206 and varying numbers and positions of the stopper walls 216, the retaining flanges 218, and the retainer springs 208 that are well within the scope of this application based on the reasons and description set forth herein.

To disassemble the sensor assembly 100 from the junction box 200, the reverse steps can be followed. The retainer springs 208 can be depressed, freeing the sensor plate 120 to be rotated out of the assembled position, and the sensor housing 110 can be withdrawn through the opening 204. This quick and efficient operation produces minimal strain on the parts, which reduces the occurrence of a part breaking, increases the ease of assembling and disassembling the probe 10, and increases the ability to assemble, disassemble, and reassemble the probe 10 multiple times.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A junction box for connecting to a sensor assembly of a probe, the sensor assembly having a housing and a plate, the junction box comprising:
   a plurality of walls, one of the walls comprising:
   an opening configured to accept insertion of the housing;
   a mating area on an interior surface of said one of the walls, wherein the mating area comprises a perimeter encompassing the opening and wherein the mating area is sized and shaped to be congruent with the plate;
   at least two stopper walls each projecting from the interior surface of said one of the walls and aligned proximate the perimeter of the mating area to obstruct the plate from rotating in a first rotational direction out of an assembled position;
   at least two retaining flanges, wherein each of the at least two retaining flanges projects from one of the stopper walls and extends over the mating area at a distance offset from the interior surface of said one of the walls to obstruct the plate from moving out of the assembled position in a direction perpendicular to the interior surface of said one of the walls; and
   at least one retainer spring comprising an interior edge aligned in a plane proximate the perimeter of the mating area and projecting outward from the interior surface of said one of the walls, wherein the at least one retainer spring is elastically deformable and configured to be pressed toward the interior surface of said one of the walls during assembly without permanently deforming and to return to a non-flexed position when the plate reaches the assembled position to obstruct rotation of the plate in a second rotational direction opposite the first rotational direction out of the assembled position.

2. The junction box of claim 1, wherein each of the at least two retaining flanges extends over the mating area substantially parallel to the mating area.

3. The junction box of claim 1, wherein each of the at least two stopper walls projects substantially perpendicularly from the mating area.

4. The junction box of claim 1, wherein each of the at least two stopper walls has a first end and a second end, wherein the first end is tapered, and wherein each of the at least two retaining flanges are positioned on the second ends of the at least two stopper walls.

5. The junction box of claim 1, wherein the mating area is shaped like a rectangle having four corners and four edges, and each of the at least two stopper walls extends from one of the corners along one of the edges.

6. The junction box of claim 1, wherein the perimeter of the mating area has more than one edge and each of the at least two stopper walls extends a short length along an edge of the mating area with respect to the full length of the edge.

7. The junction box of claim 1, wherein the perimeter of the mating area has at least one corner, wherein each of the at least two stopper walls has a first end and a second end, the first end being nearer to one of the corners than the second end to any of the corners, and wherein each of the at least two retaining flanges is positioned on the first ends of the at least two stopper walls.

8. The junction box of claim 1 wherein the at least one retainer spring comprises:

a base portion extending from the interior surface of said one of the walls substantially parallel to the interior surface of said one of the walls;

a stepped portion extending from the base portion and projecting outward from the interior surface of said one of the walls; and a pressing portion extending from the stepped portion substantially parallel to the interior surface of said one of the walls, wherein the pressing portion is configured to be pressed by the plate, and wherein one of the stepped portion and the pressing portion is configured to obstruct rotation of the plate in the second rotational direction out of the assembled position.

9. The junction box of claim 1, wherein the perimeter of the mating area has at least one corner, wherein the at least one retainer spring projects from the interior surface of said one of the walls along the perimeter of the mating area toward the at least one corner.

10. The junction box of claim 1, wherein the mating area further comprises rests upon which the plate mates during assembly into the assembled position.

11. A junction box for connecting to a sensor assembly of a probe, the sensor assembly having a housing and a plate, the junction box comprising:

a plurality of walls, one of the walls comprising:

an opening configured to accept insertion of the housing;

a mating area on an interior surface of said one of the walls, wherein the mating area comprises a perimeter encompassing the opening and wherein the mating area is sized and shaped to be congruent with the plate;

at least two stopper walls each projecting from the interior surface of said one of the walls and aligned proximate the perimeter of the mating area to obstruct the plate from rotating in a first rotational direction out of an assembled position;

at least two retaining flanges, wherein each of the at least two retaining flanges projects from one of the stopper walls and extends over the mating area at a distance offset from the interior surface of said one of the walls to obstruct the plate from moving out of the assembled position in a direction perpendicular to the interior surface of said one of the walls; and at least one retainer spring comprising an interior edge, a base portion, a stepped portion, and a pressing portion, wherein the interior edge is aligned in a plane proximate the perimeter of the mating area and projecting outward from the interior surface of said one of the walls, wherein the base portion extends from the interior surface of said one of the walls, wherein the stepped portion extends from the base portion and projects outward from the interior surface of said one of the walls, wherein the pressing portion extends from the stepped portion substantially parallel to the interior surface of said one of the walls, and wherein the at least one retainer spring is elastically deformable and configured to be pressed toward the interior surface of said one of the walls during assembly without permanently deforming and to return to a non-flexed position when the plate reaches the assembled position to obstruct rotation of the plate in a second rotational direction opposite the first rotational direction out of the assembled position.

12. The junction box of claim 11, wherein each of the at least two stopper walls has a first end and a second end, wherein the first end is tapered, and wherein each of the at least two retaining flanges are positioned on the second ends of the at least two stopper walls.

13. The junction box of claim 11, wherein the mating area is shaped like a rectangle having four corners and four edges, and each of the at least two stopper walls extends from one of the corners along one of the edges.

14. The junction box of claim 11, wherein the perimeter of the mating area has more than one edge and each of the at least two stopper walls extends a short length along an edge of the mating area with respect to the full length of the edge.

15. The junction box of claim 11, wherein the perimeter of the mating area has at least one corner, wherein each of the at least two stopper walls has a first end and a second end, the first end being nearer to one of the corners than the second end to any of the corners, and wherein each of the at least two retaining flanges is positioned on the first end of the at least two stopper walls.

16. The junction box of claim 11, wherein the mating area further comprises rests upon which the plate mates during assembly into the assembled position.

17. A method of assembling a junction box and a sensor assembly of a probe wherein the sensor assembly comprises a housing and a plate, wherein the junction box comprises a plurality of walls, one of the walls comprising a mating area on an interior surface of said one of the walls, at least two stopper walls each projecting from the interior surface of said one of the walls, at least two retaining flanges each projecting from one of the stopper walls and extending over the mating area at a distance offset from the interior surface of said one of the walls, and at least one retainer spring comprising an interior edge proximate the perimeter of the mating area and projecting from the interior surface of said one of the walls, wherein said one of the walls comprises an opening, and wherein the method comprises:

inserting the sensor assembly through the opening;

pressing the plate onto the at least one retainer spring and elastically deforming the at least one retainer spring;

rotating the sensor assembly in a first rotational direction until the at least one retainer spring is unobstructed by the plate and returned to a non-deformed position where the retainer spring obstructs rotation of the plate in a second rotation direction opposite the first rotational direction.

18. The method of claim 17, wherein the sensor assembly is rotated in the first rotational direction until the plate is obstructed by the at least two stopper walls from rotating further in the first rotational direction.

19. The method of claim 17, wherein the sensor assembly is rotated in the first rotational direction until the plate is between the at least two retaining flanges and the interior surface of said one of the walls.

20. The method of claim 17, wherein the step of inserting the sensor assembly through the opening comprises orienting the sensor assembly with the plate oriented to an insertion position rotationally offset from the mating area, wherein the sensor plate avoids contacting the at least two stopper walls and the at least two retaining flanges during insertion.

* * * * *